United States Patent
Sheng et al.

(10) Patent No.: US 10,296,664 B2
(45) Date of Patent: May 21, 2019

(54) SCALABLE AND PRECISE FITTING OF NURBS SURFACES TO LARGE-SIZE MESH REPRESENTATIONS

(71) Applicant: AUTODESK, Inc., San Rafael, CA (US)

(72) Inventors: Xuejun Sheng, Ypsilanti, MI (US); Jingyang John Chen, Novi, MI (US); Wayne Catalfano, Novi, MI (US)

(73) Assignee: AUTODESK, INC., San Rafael, CA (US)

( * ) Notice: Subject to any disclaimer, the term of this patent is extended or adjusted under 35 U.S.C. 154(b) by 631 days.

(21) Appl. No.: 14/973,360

(22) Filed: Dec. 17, 2015

(65) Prior Publication Data
US 2017/0177745 A1 Jun. 22, 2017

(51) Int. Cl.
*G06F 17/50* (2006.01)
*G06F 17/17* (2006.01)

(52) U.S. Cl.
CPC ............ *G06F 17/50* (2013.01); *G06F 17/175* (2013.01); *G06F 17/5086* (2013.01)

(58) Field of Classification Search
CPC ....................................................... G06F 17/50
USPC ................................................................ 703/1
See application file for complete search history.

(56) References Cited

U.S. PATENT DOCUMENTS 6,476,804 B1 * 11/2002 Costabel ................. G06T 13/20
345/419
2014/0257759 A1 * 9/2014 Sheng ..................... G06F 17/50
703/1

* cited by examiner

Primary Examiner — Timothy A Mudrick
(74) Attorney, Agent, or Firm — Artegis Law Group, LLP

(57) ABSTRACT

One embodiment of the invention disclosed herein provides techniques for fitting a mesh representation that includes a plurality of mesh points with a NURBS surface. A subdividing engine subdivides the mesh representation into a plurality of patches in a parametric domain. A vertex solving engine computes one or more vertex boundary continuity constraints for each vertex included in a plurality of vertices associated with the plurality of patches. An edge solving engine computes one or more edge boundary continuity constraints for each edge included in a plurality of edges associated with the plurality of patches. A patch solving engine fits a first patch included in the plurality of patches with at least one partial NURBS surface based on the vertex boundary continuity constraints and the edge boundary continuity constraints.

20 Claims, 7 Drawing Sheets

SCALABLE AND PRECISE FITTING OF NURBS SURFACES TO LARGE-SIZE MESH REPRESENTATIONS

BACKGROUND OF THE INVENTION

Field of the Invention

The present invention relates generally to computer-aided design (CAD) applications and, more specifically, to scalable and precise fitting of NURBS surfaces to large-size mesh representations.

Description of the Related Art

In the field of computer-aided design and manufacturing, a physical model of a new design is created by one or more engineers via a particular medium. For example, a physical model for a new automobile body design could be formed from clay. The surface of the physical model is then scanned via some form of 3D digital data acquisition technology, such as a laser scanner, to create a machine-readable, three-dimensional (3D) representation of the physical model. Alternatively, the new design can be generated via a computer using one or more 3D modelling programs, thereby obviating the need for creating and scanning a physical model of the new design. In either case, the output of the scanning technique or modeling program is a large-size mesh representation of the new design that consists of a large number of geometry primitives, such as triangles, quadrilaterals, or surface patches. Each geometry primitive is represented by multiple mesh points at particular positions in 3D space. The large-size mesh representation may be further manipulated via a computer-aided design system. Once complete, the large-size mesh representation can then be transferred to a manufacturing facility for fabrication of one or more prototypes of the new design.

In order to capture the fine surface details that may be associated with complex physical models, a larger-size mesh representation for a new design may typically contain many millions or billions of vertices. Because of the size and amount of information associated with such large-size mesh representations, these representations are oftentimes difficult to process and manipulate in current CAD systems without noticeable performance degradation. Consequently, large-size mesh representations are usually converted into high-level smooth-surface representations that are compact in size and include the fine detail of the original large-size mesh representations. These high-level smooth-surface representations are easier to process and manipulate in current CAD program because local and global changes and edits can be made to the high-level smooth-surface representation intuitively via manipulating control points associated with the representation.

One such high-level smooth-surface representation is non-rational uniform B-spline (NURBS) surface, which is a popular surface representation for industrial design applications and data exchanges between CAD systems. A large-size mesh representation can be converted into a NURBS surface via a fitting process, whereby the large-size mesh representation is fitted with a NURBS surface. The fitted NURBS surface approximates the surface of the original large-size mesh representation. A NURBS surface exhibits excellent algorithmic properties relative to mesh representations, including convex hull and variation diminishing properties, that lead to fast and numerically stable execution of certain geometric operations. Although a NURBS surface is compact compared to a corresponding large-size mesh representation, in order to reproduce fine details of a large-size mesh representation via a NURBS surface, a large number of control points need to be included in the NURBS surface. The number of control points can oftentimes exceed one million. Even though certain characteristics of NURBS surfaces can be exploited to simplify the process of converting a large-size mesh representation into a NURBS surface, as the number of control points increases, the conversion process can nonetheless overwhelm a conventional CAD system in terms of both memory use and processing requirements. Moreover, large-size mesh representations often include imperfections, such as holes or surface gaps. When a large-size surface representation is fitted with a NURBS surface that includes such imperfections, the resulting NURBS surface may exhibit corresponding imperfections.

To address the above issues, a "remeshing" process can be implemented when converting a large-size mesh representation into a NURBS surface. When being remeshed, the large-size mesh representation is divided into thousands of smaller quad-patches based on local principal curvature directions. The quad-patches are then individually converted into smaller NURBS surfaces that are subsequently "stitched" together to approximate the surface of the original large-size mesh representation. Oftentimes, converting small quad-patches into NURBS surfaces and stitching the NURBS surfaces together consumes fewer processing and memory resources relative to converting a single large-size mesh representation into a single NURBS surface.

One drawback to remeshing a large-size mesh representation is that a high-quality remeshing is difficult to achieve when the original large-size mesh representation contains surface holes or cracks. In addition, certain applications, such as industrial design applications, may require curvature continuity, also referred to as $G^2$ continuity, in order to meet aesthetic goals for the new design corresponding to a given large-scale mesh representation. However, remeshing typically guarantees only tangency, also referred to as $G^1$ continuity, which is usually insufficient to meet $G^2$ continuity requirements. Further, tolerance control is sometimes difficult to achieve when performing remeshing operations, and certain subsequent processing operations routinely performed on single NURBS surfaces may perform inefficiently or may fail altogether when applied to a collection of remeshed NURBS surfaces. Stated another way, a collection of remeshed NURBS surfaces lacks the beneficial algorithmic properties of a single NURBS surface, such as convex hull and variation diminishing properties that result in fast, numerically stable execution of geometric operations.

As the foregoing illustrates, what is needed are more effective ways to convert large-size mesh representations of objects into NURBS surfaces.

SUMMARY OF THE INVENTION

One embodiment of the present application sets forth a method for fitting a mesh representation that includes a plurality of mesh points with a NURBS surface. The method includes subdividing the mesh representation into a plurality of patches in a parametric domain. The method further includes computing one or more vertex boundary continuity constraints for each vertex included in a plurality of vertices associated with the plurality of patches. The method further includes computing one or more edge boundary continuity constraints for each edge included in a plurality of edges associated with the plurality of patches. The method further includes fitting a first patch included in the plurality of patches with at least one partial NURBS surface based on the vertex boundary continuity constraints and the edge boundary continuity constraints.

Other embodiments of the present invention include, without limitation, a computer-readable medium including instructions for performing one or more aspects of the disclosed techniques, as well as a system for performing one or more aspects of the disclosed techniques.

At least one advantage of the disclosed techniques is that a large-size mesh representation with fine details is precisely and accurately reconstructed as a single high-level smooth-surface representation, such as a NURBS surface, while imperfections in the large-size mesh representation, such as holes and cracks, are repaired automatically. The characteristics of the resulting NURBS surface are more suitable for integration in a typical industrial design workflow, relative to prior techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Hardware Overview

Figure 1:
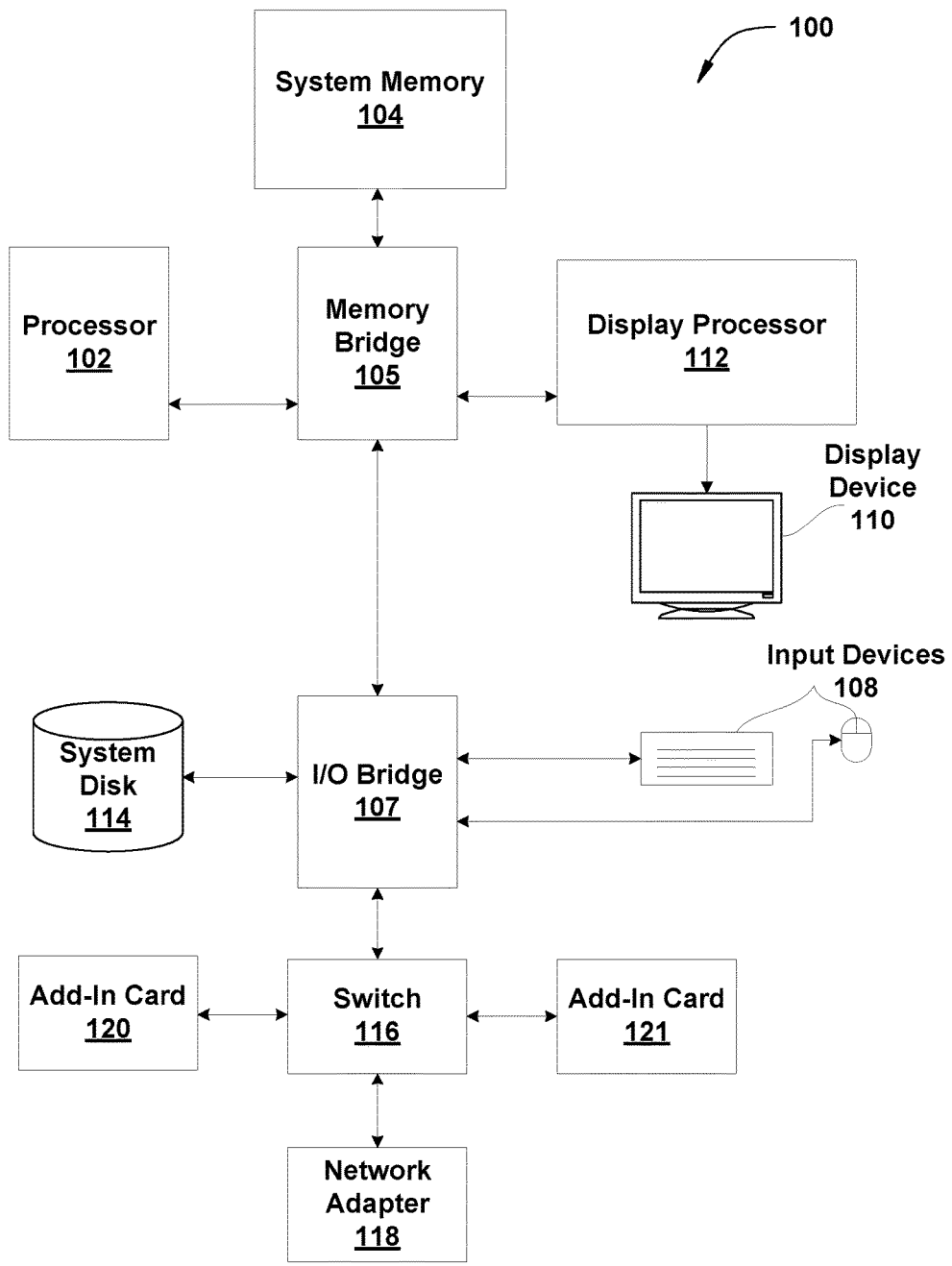
FIG. 1 illustrates a computing system configured to implement one or more aspects of the present invention.

FIG. 1 illustrates a computing system 100 configured to implement one or more aspects of the present invention. This figure in no way limits or is intended to limit the scope of the present invention. Computing system 100 may be a personal computer, video game console, personal digital assistant, mobile phone, mobile device, or any other device suitable for implementing one or more aspects of the present invention.

As shown, computing system 100 includes, without limitation, a processor 102, display processor 112, input/output (I/O) bridge 107, and system memory 104, coupled together and communicating via a bus path that may include a memory bridge 105. Processor 102 may be any technically feasible form of processing device configured to process data and execute program code. Processor 102 could be, for example, a central processing unit (CPU), a graphics processing unit (GPU), an application-specific integrated circuit (ASIC), a field-programmable gate array (FPGA), and so forth. Likewise, display processor 112 may be any technically feasible form of processing device configured to process data and execute program code. Display processor 112 could be, for example, a central processing unit (CPU), a graphics processing unit (GPU), an application-specific integrated circuit (ASIC), a field-programmable gate array (FPGA), and so forth.

Processor 102 and display processor 112 include one or more processing cores. In operation, one or both of processor 102 and display processor 112 is the master processor of computing system 100, controlling and coordinating operations of other system components. System memory 104 stores software applications and data for use by processor 102. Either or both of processor 102 and display processor 112 execute software applications stored within system memory 104 and optionally an operating system. In particular, either or both of processor 102 and display processor 112 executes software and then performs one or more of the functions and operations set forth in the present application. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to processor 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by processor 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by processor 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, processor 102, and I/O bridge 107 to form a system on chip (SoC). In still further embodiments, display processor 112 is omitted and software executed by processor 102 performs the functions of display processor 112.

Pixel data can be provided to display processor 112 directly from processor 102. In some embodiments of the present invention, instructions and/or data representing a scene are provided to a render farm or a set of server computers, each similar to computing system 100, via network adapter 118 or system disk 114. The render farm generates one or more rendered images of the scene using the provided instructions and/or data. These rendered images may be stored on computer-readable media in a digital format and optionally returned to computing system 100 for display. Similarly, stereo image pairs processed by display processor 112 may be output to other systems for display, stored in system disk 114, or stored on computer-readable media in a digital format.

Alternatively, processor 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

Processor 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to processor 102 directly rather than through a bridge, and other devices communicate with system memory 104 via memory bridge 105 and processor 102. In other alternative topologies display processor 112 is connected to I/O bridge 107 or directly to processor 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Fitting NURBS Surface to Large-Size Mesh Representations

Figure 2:
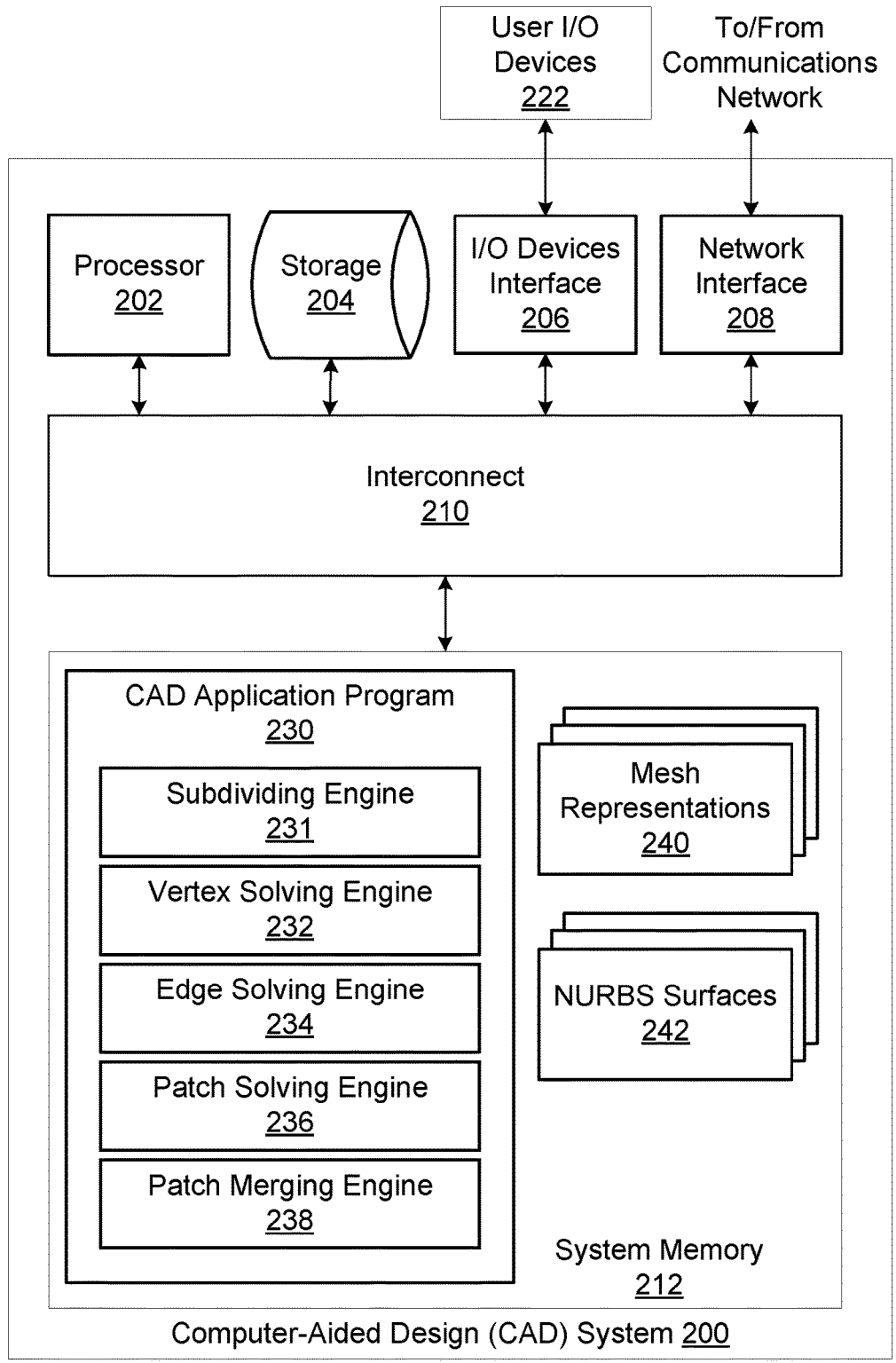
FIG. 2 is a block diagram of a computer aided design (CAD) system as implemented on the computer system of FIG. 1, according to various embodiments of the present invention.

FIG. 2 is a block diagram of a computer aided design (CAD) system 200 as implemented on the computing system 100 of FIG. 1, according to various embodiments of the present invention. In some embodiments, at least a portion of the CAD system 200 may be implemented via the computing system 100 of FIG. 1. As shown, the CAD system 200 includes, without limitation, a central processing unit (CPU) 202, storage 204, an input/output (I/O) devices interface 206, a network interface 208, an interconnect 210, and a system memory 212. The computing system 100 of FIG. 1 can be configured to implement the CAD system 200. The processor 202, storage 204, I/O devices interface 206, network interface 208, interconnect 210, and system memory 212 function substantially the same as described in conjunction with FIG. 1 except as further described below.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a CAD application program 230, large-size mesh representations 240 (hereinafter, mesh representations 240), and high-level smooth-surface representations 242 (hereinafter NURBS surfaces 242). The CAD application program 230, in turn, includes, without limitation, a subdividing engine 231, a vertex solving engine 232, an edge solving engine 234, a patch solving engine 236, and a patch merging engine 238.

The CAD application program 230 includes tools for creating and modifying 3D models. Such 3D models may be generated from a scan of a physical model with a laser scanner or may be created from within the CAD application program 230. In various embodiments, the CAD application program 230 may reside on a single user system, where such a system accommodates one user at any given time. Alternatively, CAD application program 230 may reside on one or more multi-user systems, where a group of users may collaboratively create and modify 3D models. Although described in the context of a CAD application program, any computer-implemented graphics program configured to perform the disclosed techniques is within the scope of the present invention.

As further described herein, the subdividing engine 231 retrieves a mesh representation from a set of mesh representations 240. The mesh representation may be formatted via any technically feasible file format, including, without limitation, stereo lithography CAD software file format, also referred to as STL files, and geometry object definition file format, also referred to as OBJ files. The subdividing engine 231 creates a parametrization for the input mesh by assigning the proper (u, v) value for each point in the mesh representation. The subdividing engine 231 parameterizes the mesh representation via any technically feasible approach, including, without limitation, planar parametrization, spherical parametrization, conformal mapping, and surface area preserving mapping. In some embodiments, the mesh representation may have been previously parameterized.

The subdividing engine 231 then subdivides the parameterized mesh representation into a set of substantially equally sized patches, where the size of each patch in the parametric domain is substantially equal to the size of the other patches in the parametric domain. This subdivision results in a number of vertices and edges that are shared by neighboring patches. In some embodiments, a patch in the parametric domain may be a 2D rectangle.

After subdividing the mesh representation, the subdividing engine 231 transfers the subdivided mesh representation to the vertex solving engine 232 to begin the processing of fitting each patch in the subdivided mesh representation to a corresponding NURBS surface. More particularly, a NURBS surface of degree p in u-direction and degree q in v-direction is defined as a bivariate piecewise rational function of the form shown in Equation 1 below:

$$S(u,v) = \sum_{i=0}^{n}\sum_{j=0}^{m} P_{i,j} w_{i,j} N_{i,p}(u) N_{j,q}(v) \bigg/ \sum_{i=0}^{n}\sum_{j=0}^{m} w_{i,j} N_{i,p}(u) N_{j,q}(v) \quad (1)$$

where $\{P_{i,j}\}$ are (n+1)×(m+1) control points, $\{w_{i,j}\}$ are the weights associated with the corresponding control points, and $N_{i,p}(u)$ and $N_{j,q}(v)$ are the B-spline base functions of degree p and q in the u- and v-directions respectively.

A common used technique to fit a NURBS surface to a set of mesh points M is the least squares fitting which minimizes the function shown in Equation 2 below:

$$f = \sum_{k=0}^{M-1} \|Q_k - S(u_k, v_k)\|^2 + \lambda F_{smooth} \quad (2)$$

where $\{Q_k\}$ are a set of mesh points, $F_{smooth}$ is a smoothness function, and λ is the weight that determines the trade-off between the least-squares result and the smoothing term. The smoothness function is based on the thin-plate deformation energy as given by Equation 3 below:

$$F_{smooth} = \iint (S_{uu}^2 + 2 S_{uv}^2 + S_{vv}^2) du dv \quad (3)$$

If the control points, parameters of mesh points, knots, and the weights are all unknown, solving Equation 3 leads to a non-linear optimization problem. In order to simplify these calculations, the vertex solving engine 232 assumes that the needed parametrization is readily obtained and that the knot vectors and weights are set a priori. Specifically, the vertex solving engine 232 sets the weights to be unit weights, that is, $\{w_{i,j}\}=1$. Given these assumptions, way the high-level smooth-surface representation given by Equation 1 is reduced to a non-rational B-spline where the only unknowns in Equation 2 are the control points, The control points are then obtained by solving the following linear equations given by Equation 4 below:

$$(A^T A + \lambda K) X = A^T B \quad (4)$$

where A, referred to herein as the system matrix, is an M×N matrix with N=(n+1)×(m+1) whose elements are B-spline basis function values, K is the matrix containing the integration values of derivatives of the B-spline base functions, $X = [P_{0,0}, \ldots, P_{n,m}]^T$, and $B = [Q_0, \ldots, Q_{M-1}]^T$.

In general, the system matrix A in Equation 4 is a sparse matrix that is symmetric, positive, and definite but not always well-conditioned. If the system matrix A is well-conditioned, then the solution is unique and can be obtained by methods such as Cholesky decomposition and other iterative methods. As shown by Equation 4, the size of the linear system to be solved is the same as the number of control points.

The vertex solving engine 232 computes the continuity constraints at each vertex of each patch. These vertex continuity constraints are then used by the edge solving engine 234 to compute constraints along the edges adjacent to the corresponding vertex. For each vertex in the mesh representation, the vertex solving engine 232 locally fits a NURBS surface at the vertex based on the mesh points around the vertex. Then the vertex solving engine 232 obtains the continuity constraints for the vertex by evaluating the derivatives of the fitted surface at that vertex.

In order for the continuity constraints at a vertex to reflect the underlying global surface as much as possible, the local surface fitting includes a fixed number l of mesh points in the neighborhood of the vertex. To find 1 nearest mesh points to a vertex P, mesh points are selected based on the proximity of each mesh point to the vertex. The vertex solving engine 232 selects the 1 nearest mesh points that are closest to the vertex by evaluating the mesh points within a small region surrounding the vertex. If the number of mesh points in the region is greater than equal to 1, then the vertex solving engine 232 selects the 1 nearest mesh points. Otherwise, the vertex solving engine 232 increases the size of the region until at least 1 mesh points are found.

The vertex solving engine 232 then solves a fitting equation similar to Equation 3, but where mesh points near the vertex P have more influence, as determined by weighting factors. The weighted least squares formulation is given by Equation 5 below:

$$f = \sum_{k=0}^{l-1} \theta(\|(u_p, v_p) - (u_k, v_k)\|)\|Q_k - S(u_k, v_k)\|^2 \quad (5)$$

where $(u_p, v_p)$ are the parametric values of vertex P and $\theta$ is a weighting function that has a maximum value at vertex P and decreases based on the distance from vertex P. In some embodiments, the weighting function is based on a Gaussian distribution function.

The vertex solving engine 232 solves Equation 5 to yield a local surface that is evaluated at vertex P to represent the continuity constraints in terms of position and derivatives. Due to the way the 1 mesh points are selected, the local surface is fitted robustly even if the vertex P is within a holes or crack in the original mesh representation. Once the vertex solving engine 232 has computed the continuity constraints for each vertex, the vertex solving engine 232 transfers the results to the edge solving engine 234 for further processing.

The edge solving engine 234 computes the continuity constraints along edges within the mesh representation. For each pair of neighboring patches that shares an edge, the edge solving engine 234 fits the continuity constraints along the shared edge so that the resulting surfaces corresponding to the two neighboring patches exhibit $C^2$ continuity with respect to each other. Similarly as described for the vertex solving engine 232, the edge solving engine 234 locally fits a surface for an edge by selecting mesh points in the neighborhood of the edge. Then the edge solving engine 234 computes the continuity constraints as positions and derivatives of the fitted surface along the corresponding edge.

The edge solving engine 234 performs a surface fitting for an edge based on all mesh points in the two neighboring patches. In order to prevent the singularity caused by empty patches, where no neighboring mesh points may be found within one or both of the neighboring patches, the edge solving engine 234 also selects the vertices of the two neighboring patches as additional mesh points for fitting. In addition, the edge solving engine 234 interpolates the position and derivatives of the two vertices of the shared edge between the neighboring patches so that the fitted surfaces of the two patches sharing the two vertices are $C^2$ continuous at the shared edge. The interpolation constraints are represented by the linear equation given as Equation 6 below:

$$CX = D \quad (6)$$

where X are the control points of the surface to be fitted, C is a matrix storing the corresponding B-spline function values, and D represents the position and derivatives to be interpolated at the two vertices. Combining Equation 6 with Equation 2 leads to the constrained fitting equation given by Equation 7 below:

$$\begin{bmatrix} A^T A + \gamma K & C^T \\ C & 0 \end{bmatrix} \begin{bmatrix} X \\ \omega \end{bmatrix} = \begin{bmatrix} \gamma A^T B \\ D \end{bmatrix} \quad (7)$$

where $\omega$ is a vector storing Lagrange multipliers. The edge solving engine 234 solves Equation 7 to yield a surface that interpolates the positions and derivatives at the two vertices of a corresponding edge. Once the edge solving engine 234 has computed the continuity constraints for each edge, the edge solving engine 234 transfers the results to the patch solving engine 236 for further processing.

Once boundary continuity constraints are computed, the patch solving engine 236 fits a NURBS surface to each corresponding patch. The patch solving engine 236 first determines the boundary control points based on $C^0$, $C^1$, and $C^2$ continuity conditions, where $C^0$, $C^1$, and $C^2$ represent position, tangency, and curvature continuity, respectively. The patch solving engine 236 then solves a fitting equation similar to Equation 2 for the remaining control points, as now described.

The boundary continuity constraints for a patch along a particular edge are obtained by directly evaluating the local surface fitted by the edge solving engine 234, where the edge solving engine 234 interpolates the position and derivatives at the two end vertices of the shared edge. As a result, the neighboring patches are continuous at the end vertices. Furthermore, two neighboring patches that share a common edge are continuous along the edge, since the neighboring patches are fitted using the same continuity constraints, as previously described.

The patch solving engine 236 then converts these continuity constraints to control points through a standard least squares fitting of curve to the patch. For the convenience of the subsequent merging process, the knot vectors in u- and v-directions for a patch are pre-defined. Specifically, the patch solving engine 236 uses uniform knots so that a knot vector is easily calculated, given the knot interval and the number of knots. In order for the linear system to be well-conditioned, the patch solving engine 236 creates at least one sample per knot interval. The start and end control points for the NURBS surface are directly obtained from the start and end points or derivatives of the corresponding patch. These two control points are fixed for the curve fitting process. The patch solving engine 236 then computes control points in a first, second, and third ring of control points that surround a given patch by solving curve fitting equations for position, first derivative, and second derivative, respectively. With the control points in the first, second, and third rings of mesh points being fixed, the patch solving engine 236 computes a version of the surface fitting Equation 2, as modified for patch fitting and given as Equation 8 below:

$$(\tilde{A}^T \tilde{A} + \lambda \tilde{K}) \tilde{X} = \tilde{A}^T B - (A_{ring}^T A_{ring} + \lambda K_{ring}) P_{ring} \quad (8)$$

where $P_{ring}$ is a matrix containing the control points in the first, second, and third rings of mesh points, respectively, $\tilde{X}$ contains the rest of control points within the patch, $\tilde{A}$ is a matrix containing the B-spline values corresponding control points $\tilde{X}$, $A_{ring}$ is a matrix containing the B-spline values corresponding control points $P_{ring}$, and $\tilde{K}$ and $K_{ring}$ are the matrices containing the integration values of B-spline basis functions. $\tilde{K}$ corresponds to the interior control points (to be solved), and $K_{ring}$ corresponds to the fixed control points $P_{ring}$ in the $1^{st}$, $2^{nd}$, and $3^{rd}$ rings, respectively. In some embodiments, continuity of higher than $C^2$ may be achieved between neighboring patches in a similar fashion. For example, for $C^3$ continuity, the patch solving engine 236 would first compute a fourth ring of control points around the patch, and then solve Equation 8 for the remainder of control points.

Once the patch solving engine 236 fits a NURBS surface to each corresponding patch, the CAD system 200 determines whether a fitting tolerance has been met for each NURBS surface to the corresponding patch. If the fitting tolerance has been met for each NURBS surface, then the patch solving engine 236 transfers the results to the patch merging engine 238 for further processing. If the fitting tolerance is not met for one or more NURBS surfaces, then the CAD system 200 further subdivides at least the patches corresponding to the NURBS surfaces that did not meet the fitting tolerance. The CAD system 200 then transfers the results to the vertex solving engine 232 for an additional iteration of the fitting process.

After NURBS surfaces have been created for each patch, and the fitting tolerance condition is met, the patch merging engine 238 merges the NURBS surface into one single NURBS surface for output. A single NURBS surface output is desirable for the subsequent CAD operations due to the compactness and the algorithmic properties of a single NURBS surface, such as convex hull and variation diminishing properties. Because surfaces of neighboring patches exhibit $C^2$ continuity with respect to each other, the patch merging engine 238 can merge the NURBS surfaces using the standard NURBS algorithms. The patch merging engine 238 merges the NURBS surfaces for the patches pairwise. For example, a mesh representation could be subdivided into patches arranged in a two dimensional array of rows and columns. The patch merging engine 238 could merge the NURBS surface for the patch in the lower left corner with the NURBS surface for the neighboring patch to the right. The patch merging engine 238 could then merge the resulting NURBS surface with the NURBS surface for the next neighboring patch to the right. The process continues until the patch merging engine 238 has merged all NURBS surfaces in the first row. In a similar fashion, the patch merging engine 238 merges the NURBS surfaces corresponding to the patches in the second row. The patch merging engine 238 could then merge each NURBS surface in the first row with the neighboring NURBS surface in the second row until all NURBS surfaces in the first row are merged with corresponding NURBS surface in the second row. The patch merging engine 238 continues this pairwise merging process until all NURBS surfaces are merged with neighboring patches on the same row and on adjacent rows. At the end of the merge process, the patch merging engine 238 produces a single NURBS surface that corresponds to the entire original mesh representation. Finally, the patch merging engine 238 stores the resulting NURBS surface into the set of NURBS surfaces 242.

Notably, neighboring patch surfaces share the same knot vectors in either u- or v-directions. Therefore, the patch merging engine 238 merges two neighboring surfaces into a composite surface via a knot removal algorithm. Because two neighboring patches exhibit $C^2$ continuity with respect to each other, the patch merging engine 238 can remove two identical knots in the merge direction without affecting the level of continuity of the resulting surface.

After the patch merging engine 238 completes the merge process to produce a single NURBS surface, the patch merging engine 238 transfers the resulting NURBS surface to the CAD system 200, which, in turn, stores the NURBS surface into the set of NURBS surfaces 242.

Table 1 below illustrates the results of fitting a NURBS surface to an original mesh representation resulting from scanning a physical model. The exemplary mesh representation contains 402,600 triangles and 203,122 points.

TABLE 1

| Number of control points | Absolute average error | Absolute maximum error | Relative average error | Relative maximum error |
| --- | --- | --- | --- | --- |
| 28 × 34 | 0.332448 | 3.512967 | 0.001039211 | 0.010981313 |
| 80 × 98 | 0.042422 | 1.175590 | 0.000132608 | 0.003674820 |
| 132 × 162 | 0.018868 | 0.478050 | 5.89802E−05 | 0.001494354 |
| 184 × 226 | 0.010647 | 0.357578 | 3.32818E−05 | 0.001117766 |
| 314 × 386 | 0.003654 | 0.164922 | 1.14222E−05 | 0.000515536 |
| 418 × 514 | 0.00183 | 0.089752 | 5.72046E−06 | 0.000280559 |
| 548 × 674 | 0.000886 | 0.058307 | 2.76958E−06 | 0.000182264 |
| 730 × 898 | 0.000398 | 0.052738 | 1.24412E−06 | 0.000164856 |
| 886 × 1090 | 0.000242 | 0.059587 | 7.56477E−07 | 0.000186265 |
| 1016 × 1250 | 0.000180 | 0.064755 | 5.62669E−07 | 0.000202420 |

The average and maximum error data between the fitted NURBS surface and the original mesh representation is shown for various numbers of control points. The absolute average and absolute maximum error are directly computed by comparing the position of each NURBS surface against the position of each corresponding patch. The relative average and relative maximum error are computed by dividing the corresponding absolute error by the dimension of the mesh representation. For the example mesh representation shown in Table 1, the mesh dimension is 319.904095 units. Under some surface refitting techniques, the fitting tolerance is expressed as a maximum allowable absolute error. However, if a mesh representation includes mesh points associated with a hole, crack, or other imperfection of the mesh representation, the absolute error around such mesh points is likely to be unacceptably high. As a result, the fitting tolerance is better expressed as an average error, to smooth out and reduce the effect of outlier mesh points resulting from imperfections in the mesh representation. As a result, the disclosed techniques automatically fits a NURBS surface to the mesh representation that automatically reduces the effects of such outlier mesh points, thereby increasing the overall fit quality of the NURBS surface.

The appropriate number of control points would be determined based on a desired fitting tolerance. As shown in Table 1, the error decreases as the number of control points increases. In other words, to achieve a particular fitting tolerance, the fitting process is iterated until the number of control points is high enough to achieve an error value that is less than or equal to the desired fitting tolerance. So, for example, to achieve a fitting tolerance of less than 10-6 relative average error, the number of control points in the final fitted surface would be greater than 730×898 but less than 886×1090, such as 834×1026.

In some cases, a particular mesh representation may have an irregular shape that cannot be precisely subdivided into an array of rectangular patches. In such cases, the CAD system 200 creates a parametric domain that is larger in size than the mesh representation, and subdivides the larger parametric domain into patches. The fitting process progresses as described herein to produce a single NURBS surface that is larger than the original mesh representation. The NURBS surface is then trimmed to remove the surface areas that extend beyond the boundaries of the mesh representation.

The majority of the computational load consumed during the above-described fitting process is consumed by the vertex solving, edge solving, and patch solving process. The percentage of computational load for these three processes increases as the size of the mesh representation increases. Because these processes perform local fitting, these three processes can be parallelized. As a result, the vertex solving engine 232 can operate on multiple vertices in parallel. Likewise, the edge solving engine 234 can operate on multiple edges in parallel and the patch solving engine 236 can operate on multiple patches in parallel. As one example, the following description exhibits the benefit of performing the vertex solving process in a parallel, multi-threaded architecture.

Consider a mesh representation that is divided into n×m patches. As a result, the subdivided mesh representation includes (n+1)×(m+1) vertices, each of which is to be processed by the vertex solving engine 232. Via a multi-threading programming interface, such as threading building blocks (TBB) from Intel Corporation, the process performed by the vertex solving engine 232 can be expressed in a parallel fashion, and the programming interface the maps the parallelized processes to available cores in a multicore processing system. The multithreaded programming interface determines the set of available threads and maps logical tasks into the available threads with support for nested parallelism. The vertex solving process is defined such that each logical task can be performed independently, and each logical task is approximately equal in terms of computational load. The logical tasks are then passed into a multi-threading function, such as the parallel_do( ) function of TBB, for execution. After the multi-threading function has finished, the results in the form of derivatives at each vertex are collected. The following pseudo-code is one example of performing the vertex solving process in a parallel, multi-threaded fashion:

```
/* define vertex solvers */
for i=0,1, ..., n do
    for j=0,1,...,m do
        vertex_solvers[i][j] = make_vertex_solver(i,j);
    end for
end for
/* construct solvers */
parallel_do (vertex_solvers);
/*solver outputs */
for i=0,1, ..., n do
    for j=0,1,...,m do
        vertex_solver[i][j]->output( );
    end for
end for
```

The effects of implementing the vertex solving engine 232 as a parallel, multithreaded engine is illustrated in Table 2 below:

As shown, the performance of the vertex solver engine 232 is given for various numbers of processing cores for mesh representations of various sizes in the range of approximately 1.4 million points to approximately 6.2 million points at a relative average tolerance of $10^{-5}$. The time in seconds is given as is the speedup factor relative to a single core implementation, indicating that a multi-threading implementation of the vertex solver engine 232 achieves significant gains in performance. For example, implementing vertex solver engine 232 on a 12-core system results in an overall speedup factor of approximately 8. Notably, the speedup factor of the vertex solver engine 232 is higher, such as approximately 10. However, the overall speedup factor is reduced to approximately 8 due to the "overhead" processes that are not parallelized, such as (u, v) parameterization and domain subdivision.

As shown in Table 2, overall performance, as measured by speedup factor, increases as the size of the mesh representation increases up to a certain point, after which the speedup factor decreases with further increases in mesh representation size. Again, this is due to the effect of the overhead processes that are not parallelized. That is, as the size of the mesh representation increases, a point is reached where the additional speedup due to parallelizing the vertex solving engine 232 is less than the additional computational load of parameterizing subdividing the larger size mesh representation. Similarly, the multi-threading speed-up factor may decrease as the number of processing cores increases, due to the higher percentage of overhead processing relative to the average per-core processing load of the parallelizable processes.

Figure 3:
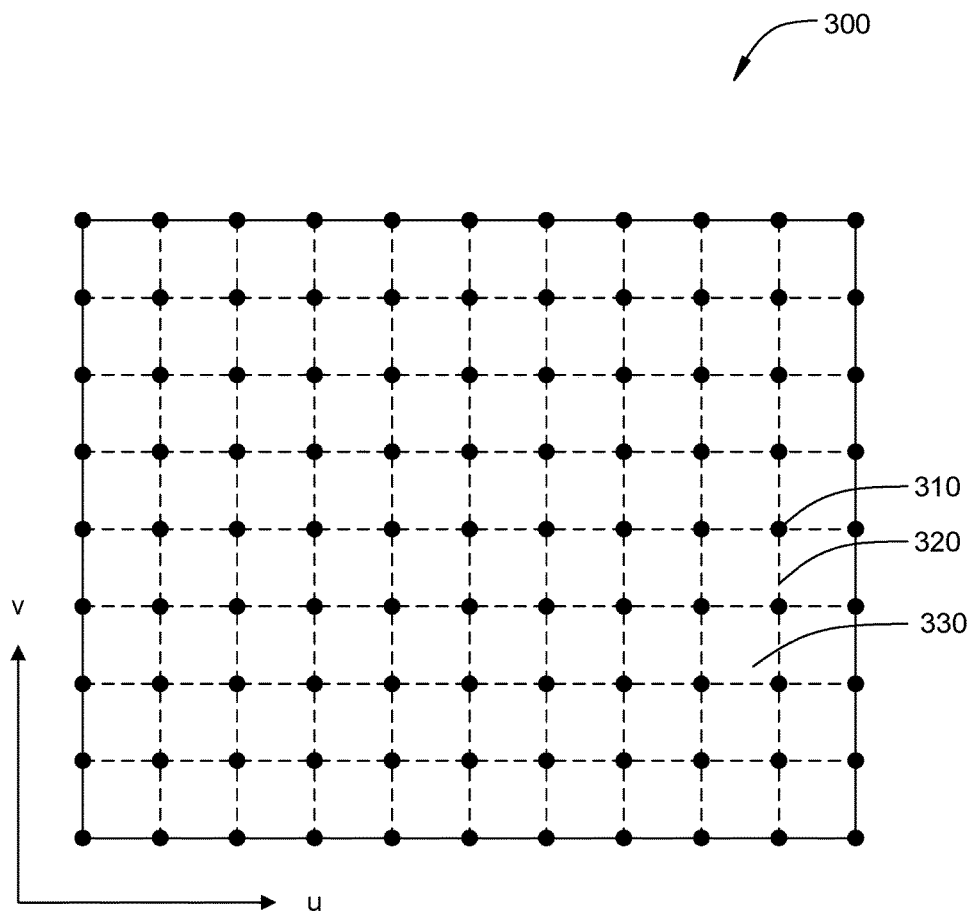
FIG. 3 illustrates an example of how a mesh representation is divided into rectangular patches in the (u, v) parametric domain, according to various embodiments of the present invention.

FIG. 3 illustrates an example of how a mesh representation 300 is divided into rectangular patches in the (u, v) parametric domain, according to various embodiments of the present invention. As shown, the mesh representation 300 is subdivided into a group of equally sized patches, such as patch 330, that are conjoined at shared edges, such as edge 320, and shared vertices, such as vertex 310. By subdividing the mesh representation 300 into patches, a large fitting task, that is, fitting the entire mesh representation 300 onto a NURBS surface, is broken down into a series of smaller tasks, where groups of mesh points are divided into patches, where each patch is individually and more efficiently fitted with a NURBS surface.

As shown, exemplary patch 330 is illustrated as a quadrilateral with four boundary edges parallel to the u- and v-axes of the parametric domain for mesh representation 300. An edge 320 of patch 330 is shared by exactly two patches if patch 330 is not a boundary edge, that is, if patch 330 does not lie on the domain boundary. A vertex 310 is shared by exactly four edges and four patches if the vertex 310 is not a boundary vertex of the mesh representation 300. This topological information as to which patches and ver-

TABLE 2

| Number of Triangles | Number of Points | Number of Control Points | 1 Core Time (sec.) | 2 Cores Time (sec.) | 2 Cores Factor | 4 Cores Time (sec.) | 4 Cores Factor | 8 Cores Time (sec.) | 8 Cores Factor | 12 Cores Time (sec.) | 12 Cores Factor |
|---|---|---|---|---|---|---|---|---|---|---|---|
| 2,907,986 | 1,461,056 | 514 × 514 | 339.315 | 176.804 | 1.919 | 102.610 | 3.307 | 54.468 | 6.230 | 43.528 | 7.795 |
| 3,403,518 | 1,704,052 | 514 × 490 | 451.800 | 229.908 | 1.965 | 131.184 | 3.444 | 72.823 | 6.204 | 54.378 | 8.308 |
| 5,043,014 | 2,524,089 | 642 × 642 | 605.911 | 318.429 | 1.903 | 176.701 | 3.429 | 98.625 | 6.144 | 77.750 | 7.793 |
| 8,942,454 | 4,475,757 | 770 × 362 | 678.502 | 376.888 | 1.800 | 215.588 | 3.147 | 134.593 | 5.041 | 109.426 | 6.201 |
| 12,429,274 | 6,220,018 | 1026 × 778 | 1038.850 | 580.589 | 1.789 | 321.185 | 3.234 | 197.923 | 5.249 | 166.888 | 6.225 | tices are on a boundary of the mesh representation 300 is used for specifying the boundary continuity constraints when fitting each patch to neighboring patches.

Figure 4:
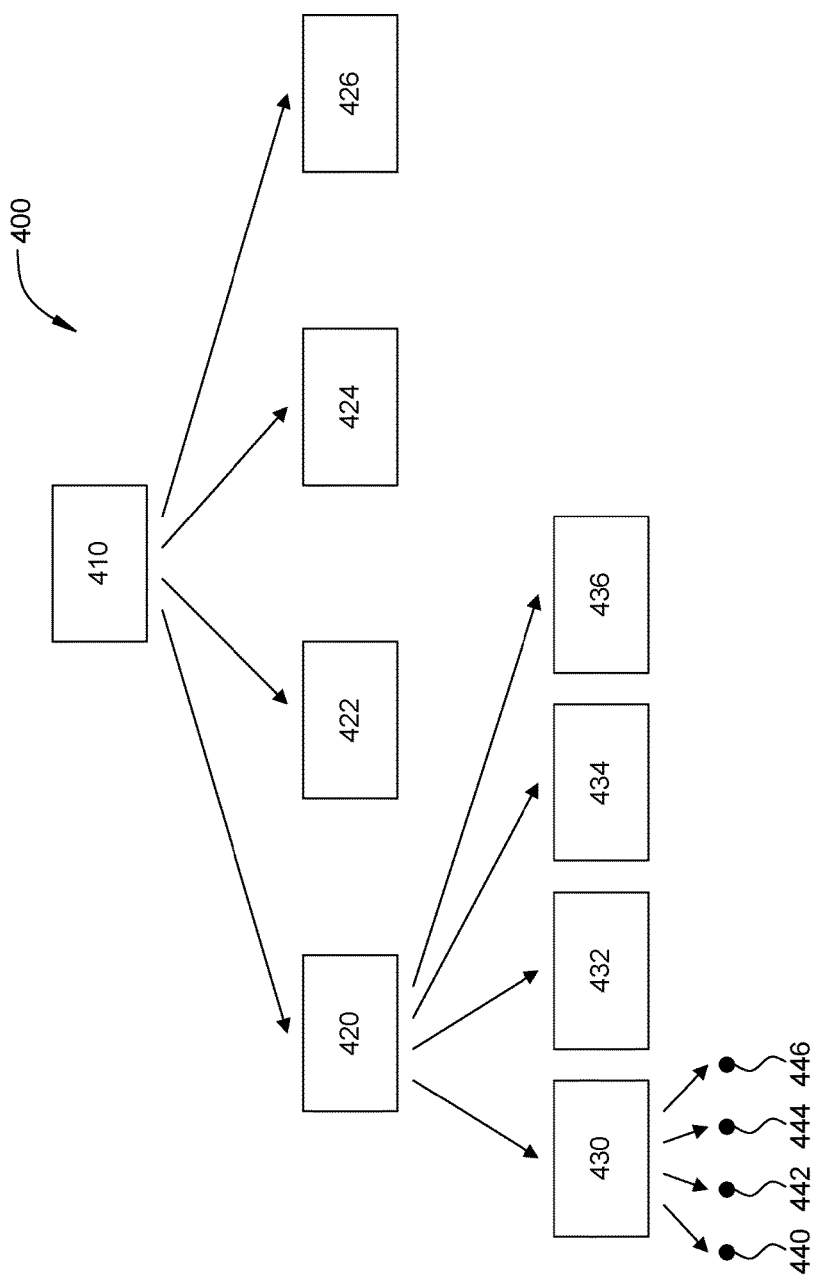
FIG. 4 illustrates an example of a hierarchical data structure for the domain subdivision of FIG. 3, according to various embodiments of the present invention.

FIG. 4 illustrates an example of a hierarchical data structure 400 for the domain subdivision of FIG. 3, according to various embodiments of the present invention. As shown, the hierarchical data structure 400 includes a root node 410, first level child nodes 420, 422, 424, and 426, second level child nodes 430, 432, 434, and 436, and mesh point nodes 440, 442, 444, and 446.

Mesh points are efficiently assigned to corresponding patches via the illustrated quadtree-like hierarchical data structure 400. Initially, after mesh points have been parameterized with corresponding (u, v) values, all mesh points in the parametric domain are assigned to root node 410. The root node 410 is then recursively subdivided into four, equally sized first level child nodes 420, 422, 424, and 426, where each of the child nodes first level 420, 422, 424, and 426 corresponds to a patch that covers one-fourth of the domain space covered by root node 410. During subdivision of a particular node, the mesh points contained in that node are reassigned to the corresponding child nodes according to the (u, v) values of the mesh points. That is, mesh points contained in root node 410 are reassigned to first level child nodes 420, 422, 424, and 426 based on the corresponding (u, v) values of each of the mesh points in root node 410. Likewise, mesh points contained in first level child node 420 are reassigned to second level child nodes 420, 422, 424, and 426 based on the corresponding (u, v) values of each of the mesh points in child node 420. As a result, exemplary second level child node 430 contains mesh points 440, 442, 444, and 446. Each child node is further subdivided until child nodes contain no mesh points or a maximum subdivision level is reached. If a particular node does not contain any mesh points, then that node is identified as an empty node. At the end of the subdivision process, all mesh points are assigned to the corresponding patches. In this manner, the parametric domain of a mesh representation is subdivided coarsely at the beginning of the fitting process and then more finely until a fitting tolerance is satisfied.

Figure 5:
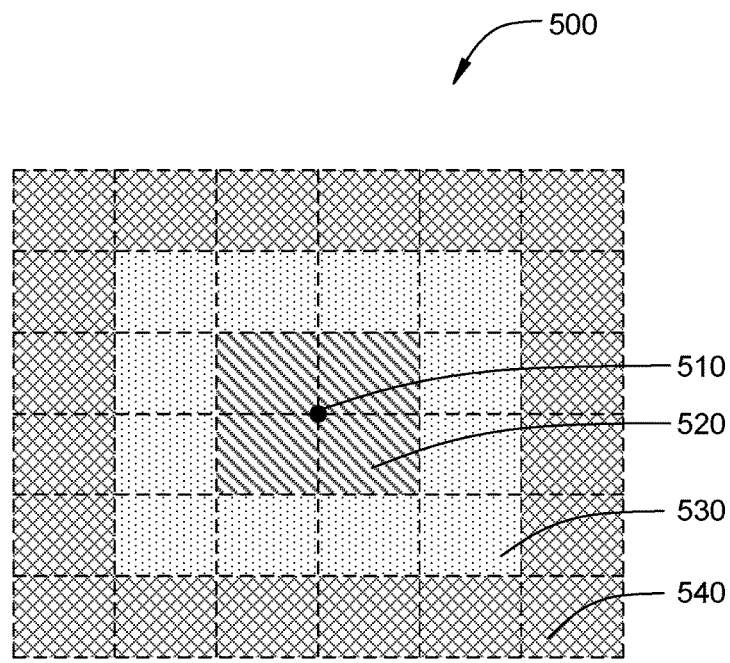
FIG. 5 illustrates how continuity constraints at a vertex of the mesh representation of FIG. 3 are computed, according to various embodiments of the present invention.

FIG. 5 illustrates how continuity constraints at a vertex 510 of the mesh representation 300 of FIG. 3 are computed, according to various embodiments of the present invention. As shown, a region 500 includes a vertex 510, a first surrounding region 520, a second surrounding region 530, and a third surrounding region 540.

As described herein, the vertex solving engine 232 computes the continuity constraints at a vertex 510 that are, in turn, used to compute constraints along the edges adjacent to the vertex 510. For each vertex 510, the vertex solving engine 232 locally fits a surface using a quantity l of mesh points selected from the region surrounding the vertex 510. The vertex solving engine 232 then computes continuity constraints by evaluating the derivatives of the fitted surface at that vertex 510.

In order for the continuity constraints at a vertex 510 to closely reflect the underlying global surface, the local surface fitting includes a fixed number l of mesh points in the neighborhood of vertex 510. To find l nearest mesh points to a vertex 510, mesh points are first selected from the first surrounding region 510. If the number of mesh points in first surrounding region 510 is greater than or equal to l, then the l mesh points closest to vertex 510 are selected. If the number of mesh points in first surrounding region 510 is less than l, then additional mesh points are selected from second surrounding region 530. If the total number of mesh points in first surrounding region 510 and second surrounding region 530 is less than l, then additional mesh points are selected from third surrounding region 540. The process continues for additional, larger surrounding regions (not explicitly shown) until l mesh points are selected.

Figure 6:
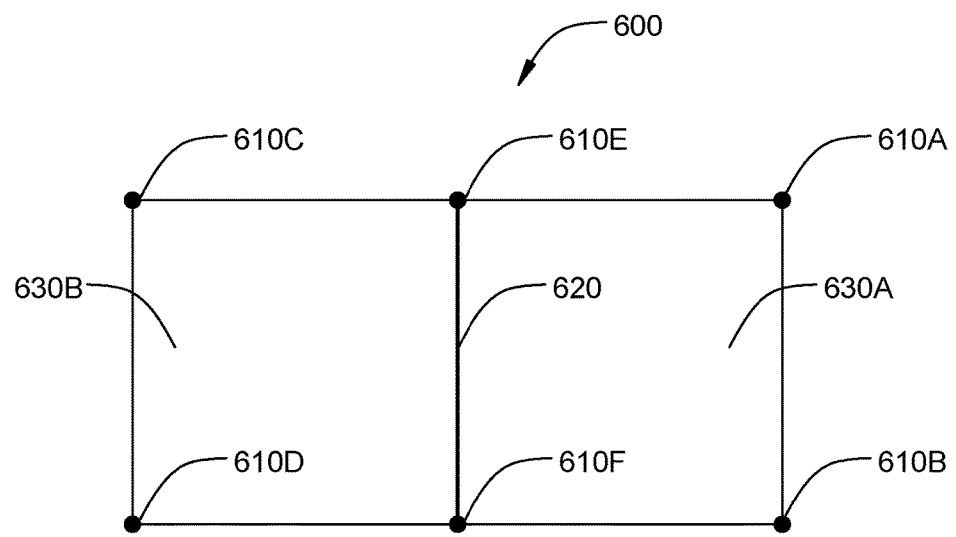
FIG. 6 illustrates how continuity constraints at an edge of the mesh representation of FIG. 3 are computed, according to various embodiments of the present invention.

FIG. 6 illustrates how continuity constraints at an edge 620 of the mesh representation 300 of FIG. 3 are computed, according to various embodiments of the present invention. As described herein, the edge solving engine 234 computing continuity constraints along an edge 620 by fitting mesh points in the two neighboring patches 630A and 630B that share edge 620.

The edge solving engine 234 performs surface fitting for the edge 620 using all mesh points contained within the two neighboring patches 630A and 630B. In the special case where one or both of the neighboring patches 630A and 630B contain no internal mesh points, the edge solving engine 234 also uses the vertices 601A, 601B, 601C, 601D, 601E and 601F of the neighboring patches 630A and 630B as additional mesh points for fitting. In addition, the edge solving engine 234 interpolates the position and derivatives of the two vertices 601E and 601F of the shared edge 620, so that the fitted surfaces of neighboring patches 630A and 630B that share the vertices 601E and 601F are continuous at edge 620. The interpolation constraints can then be computed as further described herein.

Figure 7:
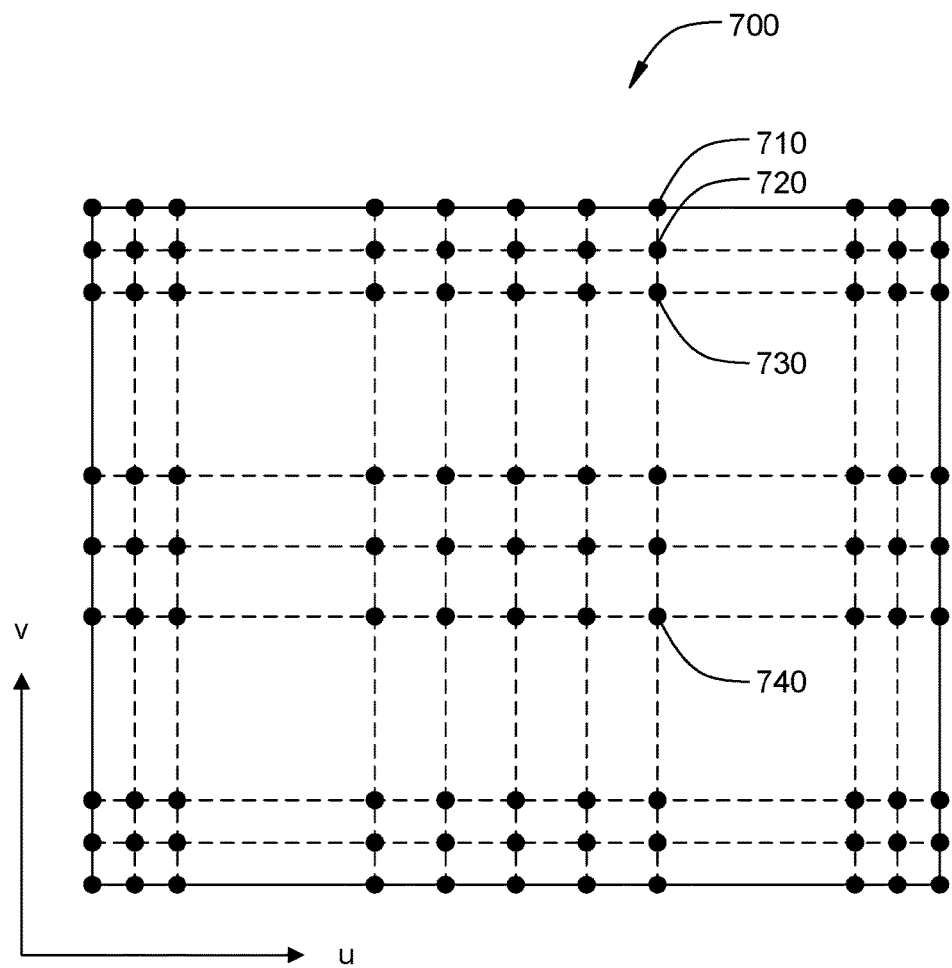
FIG. 7 illustrates how a patch of the mesh representation of FIG. 3 is fitted with a NURBS surface, according to various embodiments of the present invention.

FIG. 7 illustrates how a patch of the mesh representation 300 of FIG. 3 is fitted with a NURBS surface, according to various embodiments of the present invention. As shown, a region 700 includes points within the patch, such as point 740, and points along a first ring, second ring, and third ring, such as points 710, 720, and 730, respectively.

As described herein, the patch solving engine 236 fits each patch with pre-computed boundary continuity constraints. The patch solving engine 236 then converts from continuity constraints to control points through the standard least squares fitting of curve. For convenience of merging, the knot vectors in u- and v-directions for a patch are pre-defined. Specifically, the patch solving engine 236 uses uniform knots so that a knot vector is easily calculated, given the knot interval and the number of knots. In order for the linear system to be well-conditioned, the edge solving engine 236 creates at least one sample per knot interval. The start and end control points are then determined. The control points in the first ring, such as control point 710, second ring, such as control point 720, and third ring, such as control point 730, are then computed by solving curve fitting equations for position, first derivative, and second derivative, respectively.

Figure 8:
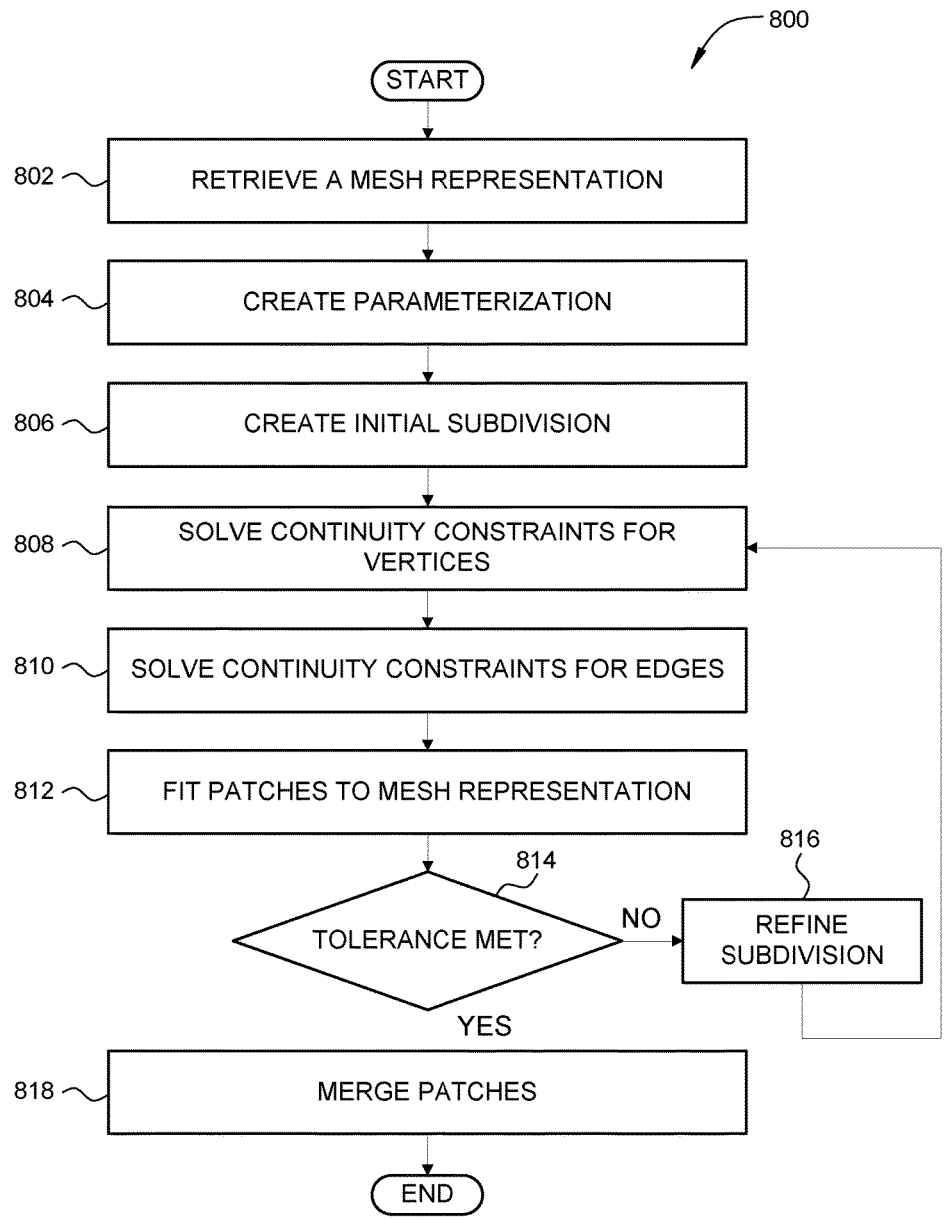
FIG. 8 is a flow diagram of method steps for fitting a mesh representation that includes a plurality of mesh points with a NURBS surface, according to various embodiments of the present invention.

FIG. 8 is a flow diagram of method steps for fitting a mesh representation that includes a plurality of mesh points with a NURBS surface, according to various embodiments of the present invention. Although the method steps are described in conjunction with the systems of FIGS. 1-2, persons of ordinary skill in the art will understand that any system configured to perform the method steps, in any order, is within the scope of the invention.

As shown, a method 800 begins at step 802, where a subdividing engine 231 retrieves a mesh representation. The mesh representation can be stored in various formats, including, without limitation, STL format and OBJ format. At step 804, the subdividing engine 231 creates a parametrization for the input mesh representation by assigning the proper (u, v) value for each point in the mesh representation. The subdividing engine 231 may create the parametrization via any technically feasible approach, including, without limitation, planar parametrization, spherical parametrization, conformal mapping, and surface area preserving mapping. At step 806, the subdividing engine 231 mesh subdivides the mesh into a set of substantially equally sized patches in the parametric domain at the next step 806. The subdivision results in a number of vertices and edges that are shared by neighboring patches.

At step 808, the vertex solving engine 232 computes continuity constraints for each vertex by fitting a surface to the mesh points in the nearest neighborhood of the vertex. At step 810, the edge solving engine 234 derives the continuity constraints along an edge from mesh points in the two neighboring patches. At step 812, the patch solving engine 236 fits a NURBS surface to the mesh points contained in each patch based on the boundary edge constraints.

At step 814, the patch solving engine 236 determines whether a fitting tolerance condition is met, where the fitting tolerance condition measures the closeness of fit between each fitted surface and the corresponding patch. If the fitting tolerance is met for all fitted surfaces, then the method 800 proceeds to step 818, where the patch merging engine 238 merges the fitted surfaces of all patches into a single large NURBS surface. The method 800 then terminates.

If, at step 814, the fitting tolerance is not met for one or more fitted surfaces, then the method 800 proceeds to step 816, where the subdividing engine 231 refines the subdivision for at least those patches corresponding to the fitted surfaces where the tolerance condition is not met. The method 800 then proceeds to step 808, described above, for another iteration of the fitting process.

In sum, techniques are disclosed for precisely and efficiently fitting a single high-level smooth-surface representation, such as a NURBS surface, to a large-size mesh representation. Such a NURBS surface is compact while retaining fine details of the corresponding mesh representation and is, therefore, more efficiently processed by a CAD system. The mesh representation is iteratively subdivided into a set of equal-sized rectangular patches in parametric space. The areas around the patch boundaries are locally fitted, thereby establishing appropriate boundary continuity constraints between neighboring patches. The boundary continuity constraints of the patches are computed in such a way that neighboring patches exhibit $C^2$ with respect to each other. Each patch is then fitted with the established continuity constraints and the mesh points associated with the patch. The fitted patch surfaces are then merged into a single NURBS surface for output. The computation of boundary continuity constraints and the fitting of patches can be performed independently, thereby providing a scalable and parallelizable approach for fitting very large-size mesh representations to a single high-level smooth-surface representation, such as a NURBS surface.

At least one advantage of the disclosed techniques is that a large-size mesh representation with fine details is precisely and accurately reconstructed as a single NURBS surface, while imperfections in the mesh representation, such as holes and cracks, are repaired automatically. Another advantage of the disclosed techniques is that the generated NURBS surface is more stable and well-conditioned relative to prior approaches. The disclosed techniques are capable of generating NURBS surfaces with millions of control points that are more robust and well behaved relative to prior approaches. Another advantage of the disclosed techniques is that the techniques scales very well with subdivision refinement and are optimized for parallel operation. As a result, the disclosed techniques may be implemented on multi-core systems over a distributed computing environment. As a result of such scalability, large-size mesh representations can be fitted with a NURBS surface even on modest computer hardware platforms.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for fitting a mesh representation that includes a plurality of mesh points with a NURBS surface, comprising:
   subdividing the mesh representation into a plurality of patches in a parametric domain;
   computing one or more vertex boundary continuity constraints for each vertex included in a plurality of vertices associated with the plurality of patches;
   computing one or more edge boundary continuity constraints for each edge included in a plurality of edges associated with the plurality of patches; and
   fitting a first patch included in the plurality of patches with at least one partial NURBS surface based on the vertex boundary continuity constraints and the edge boundary continuity constraints.

2. The method of claim 1, further comprising:
   determining that the at least one partial NURBS surface meets or exceeds a fitting tolerance limit with respect to the first patch; and
   merging the at least one partial NURBS surface with at least one other partial NURBS surface to generate a final NURBS surface.

3. The method of claim 1, further comprising:
   determining that the at least one partial NURBS surface does not meet or exceed a fitting tolerance limit with respect to the first patch;
   subdividing the first patch into a second plurality of patches;
   modifying the plurality of patches by replacing the first patch with the second plurality of patches; and
   repeating the steps of computing one or more vertex boundary continuity constraints, computing one or more edge boundary continuity constraints, and fitting a first patch included in the plurality of patches.

4. The method of claim 1, wherein at least one of computing one or more vertex boundary continuity constraints and computing one or more edge boundary continuity constraints is performed as a parallel, multithreaded process.

5. The method of claim 1, wherein the one or more vertex boundary continuity constraints for each vertex are based on a specified number of mesh points included in the plurality of mesh points that are within a threshold distance from the vertex.

6. The method of claim 1, wherein the one or more edge boundary continuity constraints for each edge are based on a specified number of mesh points included in the plurality of mesh points that are within a threshold distance from the edge.

7. The method of claim 6, wherein the one or more edge boundary continuity constraints for each edge are further based on vertices of the at least one partial NURBS surface and vertices of at least one other partial NURBS surface that is adjacent to the at least one partial NURBS surface.

8. The method of claim 1, wherein fitting the first patch included in the plurality of patches with at least one partial NURBS surface is further based on mesh points that are within the boundaries of the first patch.

9. A non-transitory computer-readable storage medium including instructions that, when executed by a processor, cause the processor to fit a mesh representation that includes a plurality of mesh points with a NURBS surface by performing the steps of:
   subdividing the mesh representation into a plurality of patches in a parametric domain;
   computing one or more vertex boundary continuity constraints for each vertex included in a plurality of vertices associated with the plurality of patches;
   computing one or more edge boundary continuity constraints for each edge included in a plurality of edges associated with the plurality of patches; and
   fitting a first patch included in the plurality of patches with at least one partial NURBS surface based on the vertex boundary continuity constraints and the edge boundary continuity constraints.

10. The non-transitory computer-readable storage medium of claim 9, further comprising:
    determining that the at least one partial NURBS surface meets or exceeds a fitting tolerance limit with respect to the first patch; and
    merging the at least one partial NURBS surface with at least one other partial NURBS surface to generate a final NURBS surface.

11. The non-transitory computer-readable storage medium of claim 9, further comprising:
    determining that the at least one partial NURBS surface does not meet or exceed a fitting tolerance limit with respect to the first patch;
    subdividing the first patch into a second plurality of patches;
    modifying the plurality of patches by replacing the first patch with the second plurality of patches; and
    repeating the steps of computing one or more vertex boundary continuity constraints, computing one or more edge boundary continuity constraints, and fitting a first patch included in the plurality of patches.

12. The non-transitory computer-readable storage medium of claim 9, wherein each patch in the plurality of patches is substantially equal in size.

13. The non-transitory computer-readable storage medium of claim 9, wherein the at least one partial NURBS surface exhibits $C^0$, $C^1$, and $C^2$ continuity with respect to at least one other partial NURBS surface that is adjacent to the at least one partial NURBS surface.

14. The non-transitory computer-readable storage medium of claim 13, wherein the at least one partial NURBS surface further exhibits $C^3$ continuity with respect to at least one other partial NURBS surface that is adjacent to the at least one partial NURBS surface.

15. The non-transitory computer-readable storage medium of claim 9, wherein the one or more vertex boundary continuity constraints for each vertex are based on a specified number of mesh points included in the plurality of mesh points that are within a threshold distance from the vertex.

16. The non-transitory computer-readable storage medium of claim 9, wherein the one or more edge boundary continuity constraints for each edge are based on a specified number of mesh points included in the plurality of mesh points that are within a threshold distance from the edge.

17. The non-transitory computer-readable storage medium of claim 16, wherein the one or more edge boundary continuity constraints for each edge are further based on vertices of the at least one partial NURBS surface and vertices of at least one other partial NURBS surface that is adjacent to the at least one partial NURBS surface.

18. The non-transitory computer-readable storage medium of claim 9, wherein fitting the first patch included in the plurality of patches with at least one partial NURBS surface is further based on mesh points that are within the boundaries of the first patch.

19. The non-transitory computer-readable storage medium of claim 9, further comprising converting the one or more vertex boundary continuity constraints and the one or more edge boundary continuity constraints into control points associated with the at least one partial NURBS surface.

20. A system, comprising:
a processor; and
a memory coupled to the processor and including a subdividing engine, a vertex solving engine, an edge solving engine, and a patch solving engine;
wherein, when executed by the processor, the subdividing engine is configured to subdivide the mesh representation into a plurality of patches in a parametric domain;
wherein, when executed by the processor, the vertex solving engine is configured to compute one or more vertex boundary continuity constraints for each vertex included in a plurality of vertices associated with the plurality of patches;
wherein, when executed by the processor, the edge solving engine is configured to compute one or more edge boundary continuity constraints for each edge included in a plurality of edges associated with the plurality of patches; and
wherein, when executed by the processor, the patch solving engine is configured to fit a first patch included in the plurality of patches with at least one partial NURBS surface based on the vertex boundary continuity constraints and the edge boundary continuity constraints.

* * * * *